United States Patent [19]

Tenniswood

[11] 4,311,293
[45] Jan. 19, 1982

[54] ROLLING CONDUCTOR SUPPORTS

[75] Inventor: David M. Tenniswood, Troy, Mich.

[73] Assignee: McGraw-Edison Company, Rolling Meadows, Ill.

[21] Appl. No.: 56,006

[22] Filed: Jul. 9, 1979

[51] Int. Cl.³ .............................................. F16L 3/00
[52] U.S. Cl. ..................................... 248/49; 248/68 R
[58] Field of Search ............... 248/68 R, 49, 52, 51; 59/78.1, 78; 191/12 C; 74/231 J, 231 M

[56] References Cited

U.S. PATENT DOCUMENTS

| | | |
|---|---|---|
| 2,864,907 | 12/1958 | Waninger . |
| 2,972,857 | 2/1961 | Bodman .......................... 59/78.1 |
| 2,975,807 | 3/1961 | Waninger . |
| 3,053,358 | 9/1962 | Gross . |
| 3,098,349 | 7/1963 | Waninger . |
| 3,448,953 | 6/1969 | Kurlanosky . |
| 3,448,954 | 6/1969 | Kurlanosky . |
| 3,503,578 | 3/1970 | Kurlanosky . |
| 3,503,579 | 3/1970 | Kurlanosky . |
| 3,504,864 | 4/1970 | Kurlanosky . |
| 3,546,875 | 12/1970 | Weber . |
| 3,566,603 | 3/1971 | Chadwick ......................... 59/78.1 |
| 3,664,619 | 5/1972 | Heidrich et al. . |
| 3,716,986 | 2/1973 | Cork ............................ 191/12 C X |
| 3,759,035 | 9/1973 | Schmidberger . |
| 3,772,875 | 11/1973 | Viano . |
| 3,782,670 | 1/1974 | Kielma ....................... 248/68 R X |
| 3,848,407 | 11/1974 | Moritz ............................. 248/49 X |
| 3,921,388 | 11/1975 | Loos ........................... 191/12 C X |
| 3,948,041 | 4/1976 | Borjesson . |
| 4,104,871 | 8/1978 | Moritz . |

Primary Examiner—J. Franklin Foss

Attorney, Agent, or Firm—Jon Carl Gealow; Bruce R. Mansfield; Hugh M. Gilroy

[57] ABSTRACT

A rolling conductor support for supporting, guiding, and protecting electrical, hydraulic, coolant and the like conductors extending between parts of machines which move relative to one another on guides or tracks. The conductor support comprises a plurality of chains connected in parallel, laterally spaced relation by conductor supporting bridges to which the conductors are fastened by releasable securements. The chains are comprised of a series of alternating and overlapping follower links and control links, overlapping portions of which are pivotally connected to each other. Six holes are formed in each follower link, one at the center of each end for making a pivotal connection to the overlapping control link. The remaining four holes, having stop pins secured therein, are positioned in pairs at each end of the link adjacent the pivotal connection. Each control link is provided with one hole for pivotal connection at the center of each end, and four arcuate slots are arranged in pairs adjacent each pivotal connection. Each slot receives an associated stop pin of the adjacent follower link.

The holes at the centers of overlapping ends of successive control and follower links are aligned, and a pin is inserted therethrough for pivotal connection of the links. As the links rotate with respect to each other, stop pins of the follower link travel within the slots of the control link. The length of the arcuate slots of the control link determines the maximum relative rotational displacement between successive control and follower links. Thus, the configuration of the arcuate slots in the control link determine the minimum bending radius of the chain, and hence of the conductor support.

17 Claims, 6 Drawing Figures

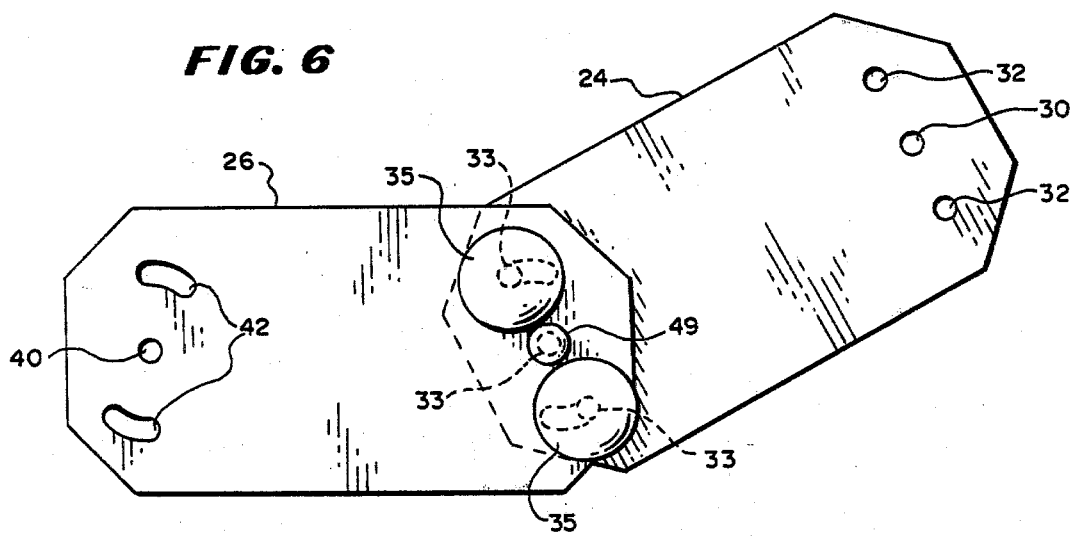

ROLLING CONDUCTOR SUPPORTS

BACKGROUND OF THE INVENTION

1. Field of the Invention

This invention pertains to rolling conductor supports, and in particular, to rolling conductor supports of the chain link type used to support, guide and protect electric, hydraulic, pneumatic and the like conductors which extend between parts of machines that move relative to each other on guides or tracks.

2. Description of the Prior Art

Chains providing support for conduits interconnecting parts of machines, movable with respect to each other such as enlarged machine tools and cranes, are known in the art. Chains of different capacities and bending radii are required to accommodate the different sizes and numbers of conduits which are required for various machines.

Prior art chains are generally satisfactory in providing conduit support. However, a supplier of such chain supports must stock an extensive inventory of chain link parts, particularly the side links thereof, wherein chains of different minimum bending radii each require side links of different configurations.

SUMMARY OF THE INVENTION

Accordingly, it is an object of this invention to simplify the construction of rolling conductor supports, and in particular, the side links thereof, so that a smaller number of link types is required to produce a number of chains of different minimum bending radii.

This object is accomplished in accordance with this invention, in one form thereof, by providing an improved rolling conductor support comprised of two or more parallel, laterally spaced-apart link chains. Each chain is comprised of a serial succession of alternating links of a first and second type, pivotally connected at their overlapping ends. A first link type, or follower link, is comprised of a rectangular plate having a major axis and transverse edges perpendicular to the major axis. Each follower link has a pair of groupings of three holes disposed in colinear relationship adjacent each transverse edge of the plate. A central hole of each grouping is located on the longitudinal center line of the plate which extends along the major axis of the follower link. Second and third holes of each grouping, located on opposite sides of the central or pivot hole, receive a first type of rotation limiting means, such as stop pins which are rigidly secured therein. A second link type, or control link, is comprised of a rectangular plate having a major axis and transverse edges perpendicular to the major axis. Each control link has, adjacent each transverse edge thereof, a grouping of a central or pivot hole, and two slots, wherein the slots comprise a second type of rotation limiting means. The pivot hole is medially located between the two slots and lies on a longitudinal center line of the plate which extends parallel to the major axis of the control link. The hole is aligned in registry with the central hole of an adjacent follower link, and a pivot pin or other cylindrical securing means is inserted therethrough for pivotal interconnection between adjacent control and follower links. The slots of the control link, disposed on opposite sides of the hole, each receive one of the stop pins secured on a follower link. The slots define or limit the arcuate travel of the stop pins of the follower link, to define a minimum bending radius of the chain and therefor, of the rolling conductor support. The pivot hole of the control link comprises the pivot point about which adjacent control and follower links rotate. The arcuate slots have the pivot hole as their center, and the length of those slots determine the included angle between the longitudinal center lines of adjacent, fully rotated control and follower links, thereby defining the bending radius of a chain formed of control and follower links.

While links may be made in various sizes and to accommodate different minimum bending radii, the follower link of this invention is common to rolling conductor supports of all minimum bending radii. Further, with the exception of the four slots formed therein, the control link is also common to rolling conductor supports of all minimum bending radii. Thus, a manufacturer's inventory of links is reduced, since only one standard link design, in addition to that of the follower link, is required. Further advantages in manufacturing rolling conductor supports is realized in that it is only necessary to punch the four slots in the follower link to form a control link. All the links required for a given rolling conductor support can therefore be prefabricated prior to a determination of the minimum bending radius that is required for a given installation. Once a minimum bending radius is defined, the required slots can be formed in the control links.

BRIEF DESCRIPTION OF THE DRAWINGS

FIG. 6 is a side view of an alternate embodiment of the invention.

DETAILED DESCRIPTION OF THE PREFERRED EMBODIMENT

Figure 1:
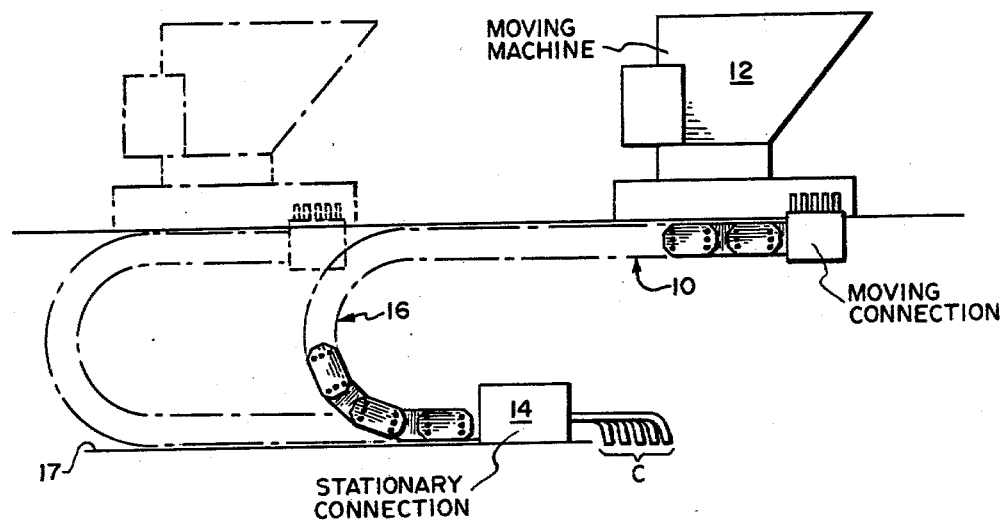
FIG. 1 is a side elevation of a rolling conductor support made according to this invention.

FIG. 1 shows a representative installation of a rolling conductor support 10 attached between a moving machine element 12 and a stationary connection 14. As moving machine element 12 moves to the left, a rolling loop 16 of the conducting support 10 also moves to the left, with an upper horizontal portion of the support becoming shorter, and a lower horizontal portion of the support becoming longer. As shown in FIG. 1, a lower horizontal portion of the chain support rests on a floor or the like support member 17.

Figure 2:
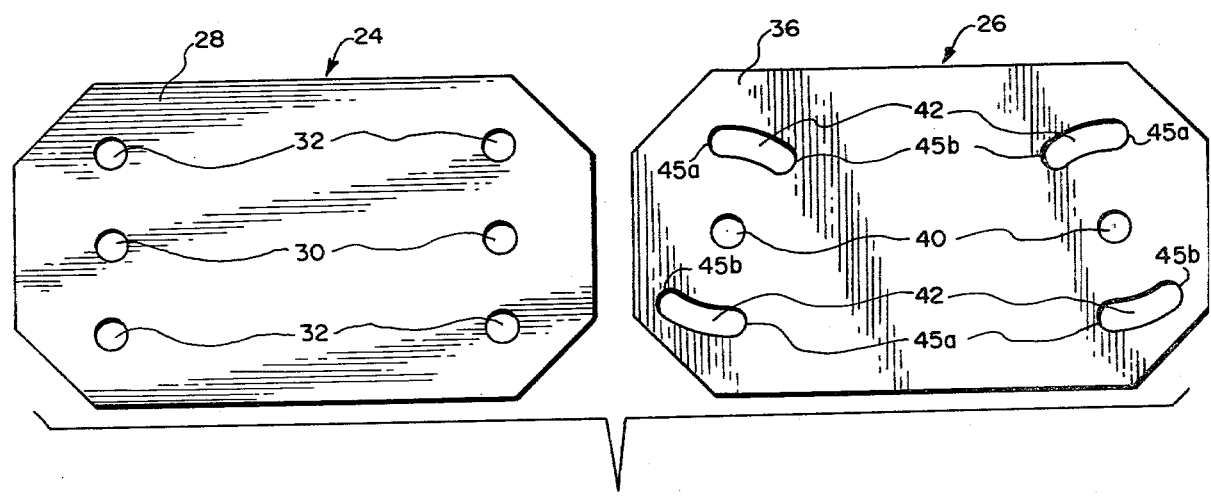
FIG. 2 is an enlarged side elevation view of a pair of chain links employed in the rolling conductor support of FIG. 1.

Rolling conductor support 10 consists of a plurality of laterally spaced-apart chains 18. Each chain 18 is comprised of a serial succession of alternating first and second types of links 24 and 26. Referring now to FIG. 2, a first link type or follower link 24 is shown as an elongated generally rectangular plate 28. Plate 28 as shown in FIG. 2 has a longitudinal center line extending in a horizontal direction, and transverse edges which extend perpendicular to the longitudinal center line. A group of three colinear holes is provided adjacent opposing transverse edges of plate 28. A first hole 30 of each group is arranged on the longitudinal center line of plate 28, and holes 32, arranged on the line perpendicular of the longitudinal center line, are disposed on either side of central hole 30. Stop pins 33 are secured in holes 32, and extend perpendicular to planar plate 28.

A second type of link, or control link 26, is shown in the right hand portion of FIG. 2. Link 26 is comprised of a planar plate 36 which is substantially identical to plate 28 of link 24, having a longitudinal center line extending in a horizontal direction, and transverse edges extending perpendicular to the longitudinal center line. Disposed adjacent each transverse edge of plate 36 is a central hole 40 located on the longitudinal center line of the plate. Hole 40 is the geometric center of a pair of arcuate slots 42 formed on opposite sides of the hole.

Figure 3:
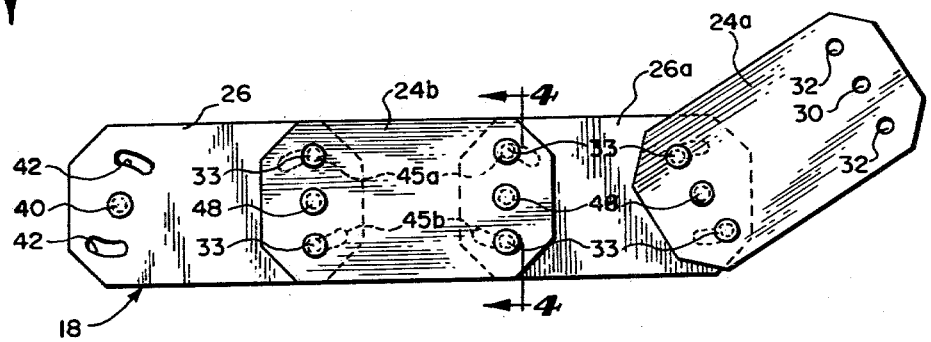
FIG. 3 is an enlarged side elevation view of a portion of the link chain comprising the rolling conductor support of FIG. 1.

Referring now to FIG. 3, a first control link 26a is shown pivotally connected to a first follower link 24a, and a second follower link 24b. The follower links 24a, 24b, are of identical construction. Pivot hole 30, located at the left end of follower length 24a, is aligned with pivot hole 40 of control link 26a. A pivot pin or rivet 48 is inserted through holes 30 and 40 to pivotally connect the follower link 24a to control link 26a. In a similar manner, the pivot hole 30 located at the right hand end of follower link 24b is aligned with pivot hole 40 at the left hand end of control link 26a. A pivot pin or rivet 48 received in pivot holes 30 and 40 pivotally connects control link 26a to follower link 24b. As can be seen from FIG. 3, when follower link 24a is pivoted with respect to control link 26a, stop pins 33 secured in holes 32 of link 24a move in the arcuate paths defined by slots 42 of link 26a. Ends 45a of slots 42 defines the bottom contour of conductor support 10, which contour usually conforms to the surface of the floor, upon which the conductor support 10 rests. The opposite ends 45b of slot 42 define the minimum bending radius of chains 18, and hence of support 10.

As shown in FIG. 3, follower link 24b is in its rest position, with stop pins 33 thereof contacting ends 45a of slots 42 in links 26. The location of ends 45a determine the maximum counter-clockwise movement of follower link 24a with respect to control link 26a. Since rolling conductor supports generally rest upon a flat floor, or are suspended from a flat overhead support, the locations of the ends 45a of slots 42 are identical for control links 26 of rolling conductor supports of all minimum bending radii, such that the longitudinal center lines of the control and follower links are colinear. By defining one end of slots 42, prior to the time a rolling conductor support is designed, more efficient production is realized. Further, production of rolling conductor supports is simplified in that ends 45a defining the rest position of chains 18 is defined by punching holes in plates 36, which holes coincide with holes 32 of links 24. Therefore, with the punching of holes defining ends 45a, partially fabricated links 26 are made identical to completely fabricated links 24. With this method of manufacture, only links 24 need be stocked, wherein links 26 can be formed from links 24 by completing the formation of slots 42.

Referring now to the right hand portion of FIG. 3, follower link 24a is in its fully pivoted position, with stop pins 33 thereof contacting ends 45b of slots 42 of link 26a. The location of slot ends 45b determines the minimum bending radius of chain 18, and hence of roller conductor support 10. Slots 42 are punched with a predetermined arcuate length so as to result in a predetermined minimum bending radius for the chain.

Figure 4:
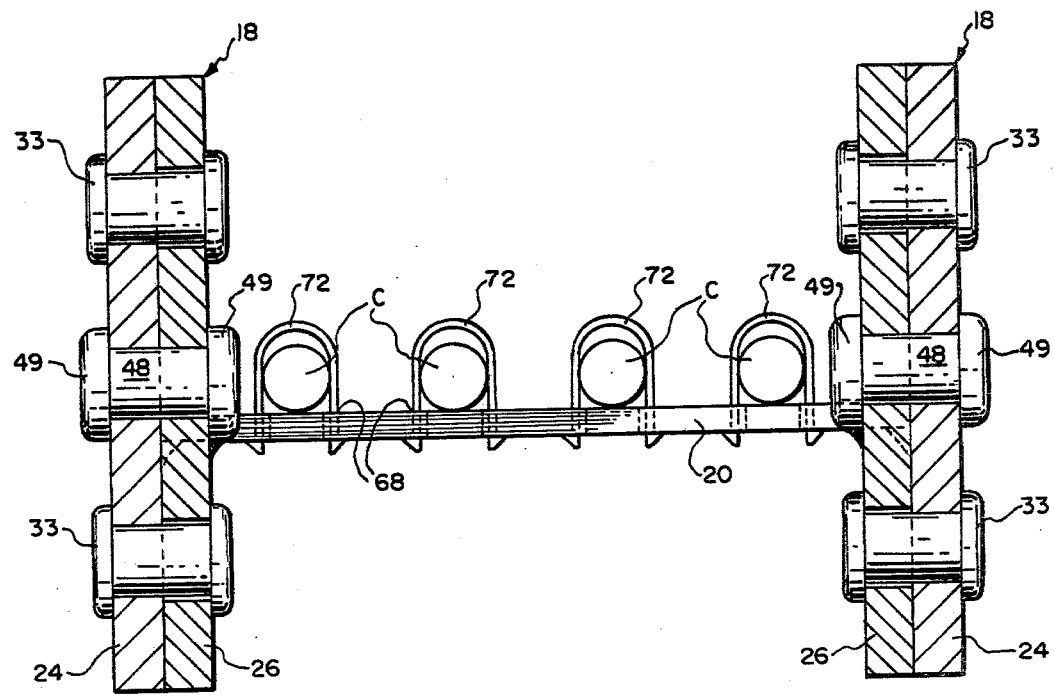
FIG. 4 is a sectional view of the rolling conductor support taken along the line 4—4 of FIG. 3.

With reference to FIG. 2, the right end of link 24 overlaps the left end of link 26 such that the central hole 30 of link 24 is aligned with the central hole 40 of link 26. Link 24 is pivotally connected to link 26 by a pin or other pivot member inserted through the aligned holes 30, 40 of links 24, 26, respectively. As shown in FIG. 4, each pivot pin 48 is cylindrical and has an integral head 49 formed at one end thereof. After insertion through holes 30, 40, pin 48 is retained in place by snap ring 52 which is received in a circumferential groove formed adjacent the free end of pin 48. The pivot pin 48 could also take the form of a rivet, threaded rod and nut assembly, or other similar fastening means. Elongated stop pins 33 are secured in holes 32 with a pressed fit, welding, or the like rigid securement, and project from the surface of plate 28. As shown in FIG. 6, stop pins 33 may be provided with enlarged heads 35 which will cover slots 42 in second links 26 from the outside of the cable chain support, when second links 26 are placed outward of first links 24 in making up the outermost chains 18. When links 24, 26 are assembled, stop pins 33 project through slots 42 of link 26. As pivotally interconnected links 24, 26, rotate with respect to each other about pivot pins 48, stop pins 33 travel within arcuate slots 42.

The minimum bending radius of chain 18, and hence the minimum bending radius of rolling conductor support 10 will be determined by the amount of movement afforded the stop pins 33, which movement is determined by the length of arcuate slots 42. All control links of any given rolling conductor support have slots 42 of identical length. It is possible however, to provide a variety of links 26 having varying slot lengths, to thereby vary the minimum bending radius of the chain support, and such is contemplated in practice. With regard to economy of manufacturing chains required to meet varying capacity and bending requirements, it will be seen that the follower links 24 may be completely fabricated as a stock item, as they are used with all rolling conductor supports, without regard to the desired minimum bending radii of the rolling conductor support. The central holes 40 of each chain link 26 are of constant location and dimension for rolling conductor supports of all radii and hence may be provided as part of a standardized, partially fabricated plate 36. After the required minimum bending radius is determined for a given installation, the length of arcuate slots 42 is calculated, and all remaining punching operations are performed on a single type of link, that of chain link 26. Thus, with the arrangement of this invention, an economical construction for rolling supports is realized since slot forming operations need be performed only on half the links required for a rolling conductor support. Further advantage is realized when the slot ends defining the rest positions of the chain are prefabricated by punching holes which are coincident with these slot ends. With this latter method of fabrication, an inventory required for a complete line of rolling supports is reduced, since a completely fabricated follower link comprises half of the links required for any rolling conductor support, and with further slot formation, becomes the remaining type of link required for a rolling conductor support. Hence, the overall manufacturing time required to provide the rolling conductor support of a given radius is greatly reduced.

Figure 5:
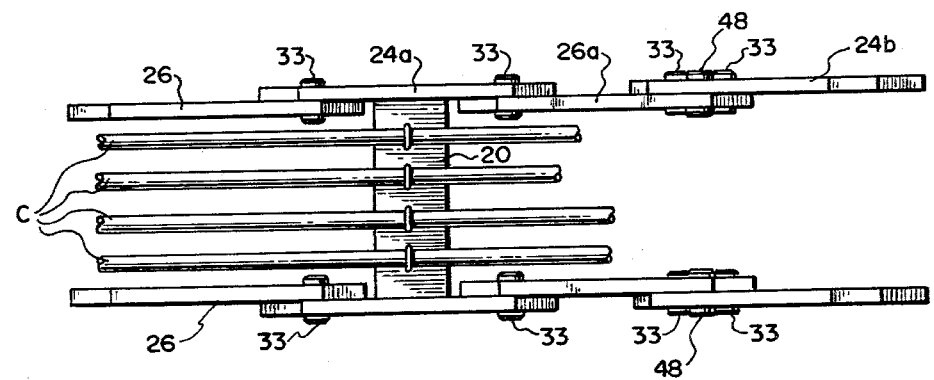
FIG. 5 is a sectional view of the rolling conductor support taken along the line 5—5 of FIG. 3.

Referring now to FIGS. 4 and 5, the rolling conductor support 10 comprises a plurality of identical, laterally spaced-apart link chains 18. Although two such laterally spaced-apart link chains are shown in the illustrated embodiment, three or more laterally spaced-apart chains might be provided as a large number of bulky or heavy conductors must be supported by a single rolling supported assembly. The chains 18 are laterally spaced-apart and connected to each other by a plurality of transversely extending conductor supporting bridges 20, as is shown in FIG. 4. The bridges may be welded or otherwise secured between chains 18. Bridges 20 are preferably secured between follower links 24, wherein a subassembly is created which may be employed with rolling conductor supports of any minimum bending radius requirement. The bridges 20 shown in FIG. 4 are each provided with a row of spaced-apart clip or retainer receiving apertures 68. The apertures 68 are so spaced that a pair of apertures bracket the conductors C of various diameters, which are laid on the bridges. The conductors are then retained on bridge 20 by a spring clip retainer 72 having resilient ends which are received in apertures 68. The clip retainer 72 may comprise a wire coated with a phenolic resin or other wear-inhibiting insulating coating.

By utilizing a rolling conductor support of this design, the links forming the rolling loop 16 rotate about their center lines, thereby minimizing the shifting of conductors carried within the rolling support, in that a smooth curve is approximated at the rolling loop 16. This design comprises an improvement over prior art rolling conductor supports which do not rotate about the longitudinal center line of the links. Further, rolling conductor supports formed from chains of the disclosed design having a pair of stop pins located adjacent each pivot pin, provide greater lateral rigidity, with a minimum of additional weight. This feature is extremely advantageous where greater lateral stress on a rolling conductor support is anticipated, and where weight restrictions, due to a maximum floor load for example, is a critical factor. Thus, a stronger, lighter, more economical rolling support allowing reduced inventory is realized by the rolling conductor support of this invention.

It is to be understood that the above-detailed description of a preferred embodiment of the invention is provided by way of example only. Various details of design and construction may be modified without departing from the true spirit and scope of the invention as set forth in the appended claims.

What I claim is:

1. A rolling conductor support comprising a plurality of chains connected together in parallel, laterally spaced apart relationship by conductor carrying means extending therebetween, each chain including a succession of alternating first and second links, said links having contiguous overlapping pivotally connected end portions, characterized in that pivotal connection includes three pivot parts spaced apart in a direction essentially perpendicular to the major axis of said first links, extending laterally between and connecting together the overlapping end portions of said links, one of said pivot parts providing a fulcrum for pivotal movement between the links, said second links having at each overlapping end portion thereof two slots of predetermined arcuate length measured in relation to said fulcrum pivot part, and the other two pivot parts interfitting in said slots and fixed to each overlapping end portion of said first link and moveable in the slots to the arcuate lengths thereof to limit pivotal movement between the links, whereby successive links fulcrum about said pivot part, and are limited in pivotal movement by said slots.

2. The invention defined by claim 1 wherein, each chain includes a succession of substantially planar alternating first and second links, said first link having two ends and six holes with three holes disposed at each overlapping end portion thereof, said second link having two ends, four slots and two holes with two slots and one hole located at each overlapping end portion thereof.

3. The invention defined in claim 2 wherein said three holes disposed at each end portion of said first link include a first hole located on the longitudinal center line of the link.

4. The invention defined in claim 3 wherein second and third holes disposed at each end portion of said first link are diametrically opposite sides of said first hole.

5. The invention defined in claim 4 wherein said second and third holes are equally spaced from said first hole.

6. The invention defined in claim 2 wherein said second link is elongated, and said hole located at each end position is located on the longitudinal axis of said link.

7. The invention defined in claim 6 wherein said two slots located at each overlapping end portion of said second link are arranged at diametrically opposite sides of said hole.

8. The invention defined in claim 7 wherein said two slots located at each overlapping end portion of said second link have end portions which are colinearly arranged with said hole located at each end portion, on a line transverse to said longitudinal axis of said second link.

9. The invention defined by claim 1 characterized in that said slots are arcuately shaped on a radius whose center coincides with the pivot part comprising said fulcrum, and said slots are spaced about said fulcrum.

10. The invention as defined in claim 1 characterized in that said pivot part which interfits in said slot is provided with a radially extending retaining portion overlying and completely covering and concealing the slots.

11. A rolling conductor support comprising a plurality of chains connected together in parallel, laterally spaced-apart relationship by conductor carrying means extending therebetween, each chain comprising a plurality of alternating first and second links pivotally secured to each other, said first link comprising a member having a pair of spaced pivot points and at least one first type of rotation limiting means associated with each of said pivot points and spaced therefrom in a direction essentially perpendicular to the major axis of said first link, said second link comprising a member having a pair of spaced pivot points, and at least one predeterminedly dimensioned second type of rotation limiting means associated with each of said pivot points, means for pivotally securing one of said first links to one of said second links at one of said pivot points of each of said links, said first type of rotation limiting means of said first link cooperating with said second type of rotation limiting means of said second link to limit in a predetermined amount the pivotal movement of said first link with respect to said second link, to thereby provide a rolling conductor support of predetermined minimum bending radius.

12. The invention defined in claim 11 wherein said first type of rotation limiting means of said first link comprises an elongated pin secured to said first link and protruding from a face of said first link, said pin engaging said second type of rotation limiting means of said second link.

13. The invention of claim 11 wherein said second type of rotation limiting means of said second link comprises an arcuate slot of predetermined length formed in said second link, said slot receiving said first type of rotation limiting means of said first link.

14. The invention of claim 11 wherein a pair of said first type of rotation limiting means is associated with each of said pivot points of each of said first links.

15. The invention of claim 11 wherein a pair of said second type of rotation limiting means is associated with each of said pivot points of said second links.

16. The device of claim 11 wherein said pivot points of said first and second links comprise apertures with cylindrical securing means received therein.

17. A rolling conductor support as set forth in claim 1, wherein said second links of the outmost pair of said plurality of chains are disposed to the interior of the rolling conductor support in each of the outermost pair of said plurality of chains, whereby said slots in said second links are covered on the outside of the rolling conductor support by said first links.

* * * * *

UNITED STATES PATENT AND TRADEMARK OFFICE
CERTIFICATE OF CORRECTION

PATENT NO. : 4,311,293
DATED : January 19, 1982
INVENTOR(S) : David M. Tenniswood It is certified that error appears in the above–identified patent and that said Letters Patent are hereby corrected as shown below:

Page 1, under References Cited "Kurlanosky" should be --Kurlandsky --.

Claim 1, column 5, line 55, after the word "that" insert the word -- the --.

Claim 11, column 6, line 56, after the word "securing" insert the word -- only --; after the word "to" insert the word -- only --.

Signed and Sealed this

Fifteenth Day of June 1982

[SEAL]

Attest:

Attesting Officer

GERALD J. MOSSINGHOFF

Commissioner of Patents and Trademarks